Oct. 1, 1929.  J. H. KINDELBERGER  1,729,878
AMPHIBIAN AIRPLANE
Filed June 1, 1927   2 Sheets-Sheet 1
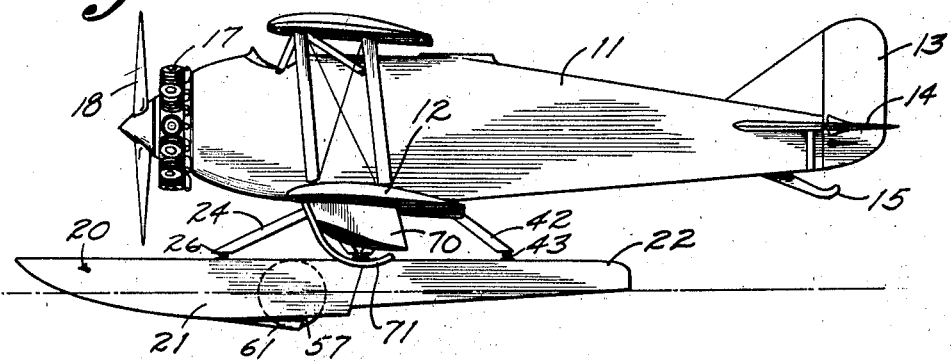
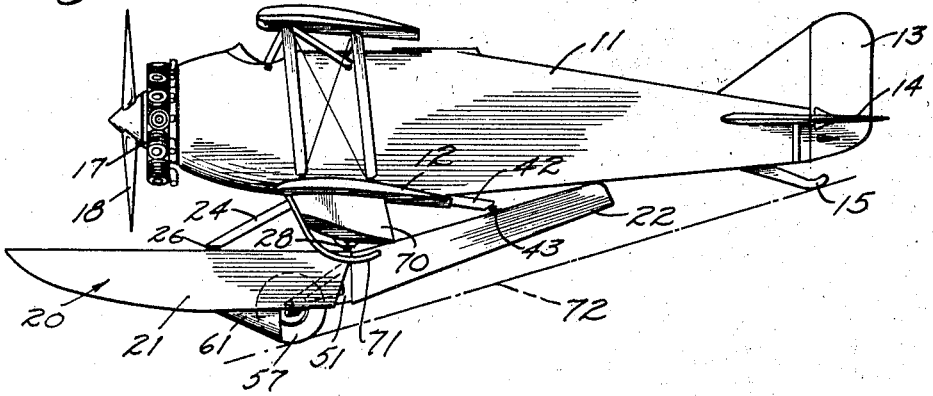
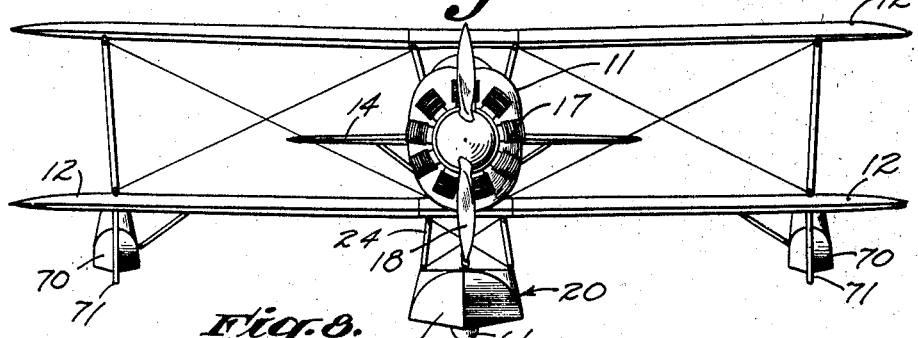
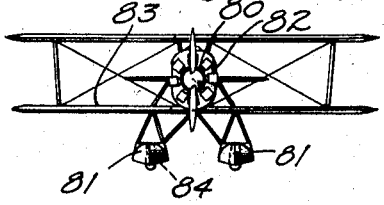
INVENTOR.
JAMES H. KINDELBERGER
BY
ATTORNEY.

Oct. 1, 1929.     J. H. KINDELBERGER     1,729,878
AMPHIBIAN AIRPLANE
Filed June 1, 1927    2 Sheets-Sheet 2
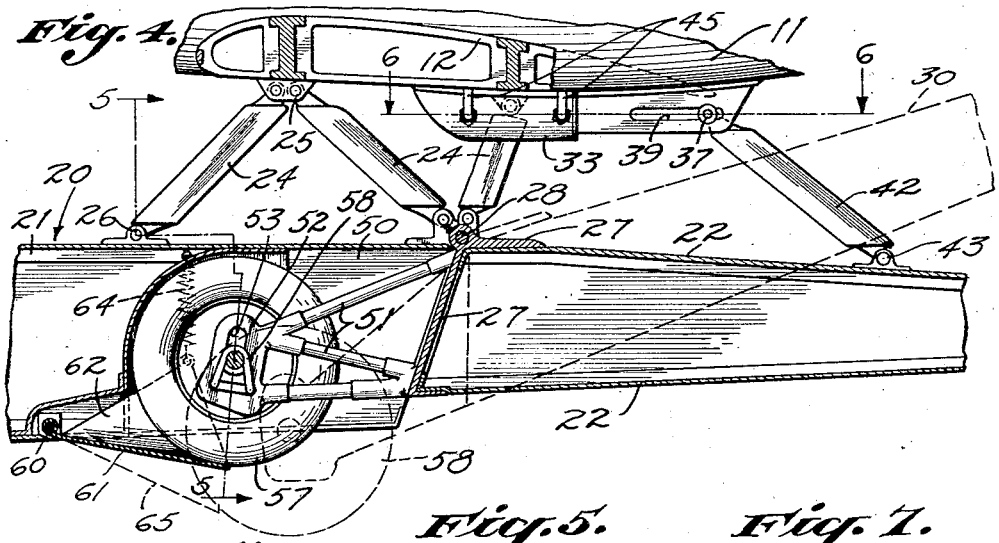
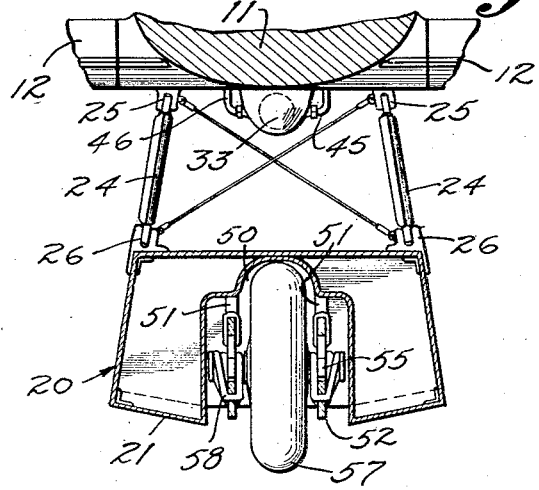
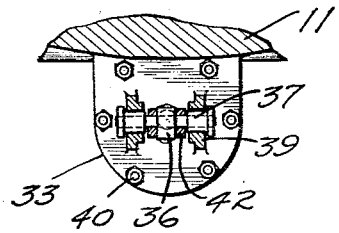
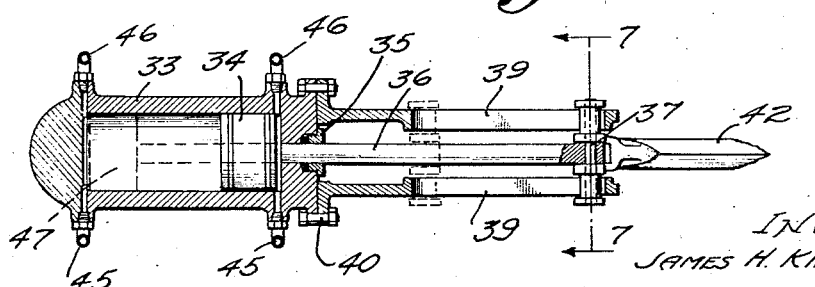
INVENTOR:
JAMES H. KINDELBERGER
BY
ATTORNEY.

Patented Oct. 1, 1929

1,729,878

UNITED STATES PATENT OFFICE

JAMES H. KINDELBERGER, OF SANTA MONICA, CALIFORNIA, ASSIGNOR, BY MESNE ASSIGNMENTS, TO DOUGLAS AIRCRAFT COMPANY, INC., OF LOS ANGELES, CALIFORNIA, A CORPORATION OF DELAWARE

AMPHIBIAN AIRPLANE

Application filed June 1, 1927. Serial No. 195,635.

My invention relates to amphibian airplanes, and has for one of its objects to provide an amphibian airplane which can be easily and quickly converted from a landplane into a seaplane, or vice versa.

It is also an object of the invention to provide an amphibian airplane of this nature in which the converting of the airplane from a land-plane into a seaplane and vice versa is accomplished by moving a portion of the water landing-gear of the airplane.

Another object of this invention is to provide an amphibian airplane of this character in which an operating mechanism provides an air-cushion for one of the landing-gears.

Other objects and advantages of the invention will be made evident in the following description.

In the accompanying drawings which will be referred to,

Fig. 1 is an elevation of the invention with the landing-gears in position to alight on the water.

Fig. 2 is an elevation similar to Fig. 1 but having the landing-gears in position to alight on land.

Fig. 3 is a front elevation of Fig. 1.

Fig. 4 is an enlarged fragmentary view through the landing-gear structure showing the details thereof.

Fig. 5 is a section taken on the line 5—5 of Fig 4.

Fig. 6 is a section taken on the line 6—6 of Fig. 4.

Fig. 7 is a section taken on the line 7—7 of Fig. 6.

Fig. 8 is a front elevational view of an alternative form of the invention.

Referring to the drawings in detail and particularly to Figs. 1 to 3 inclusive, the airplane embodying the features of this invention has a fuselage 11, airfoils 12, a rudder 13, an elevator 14, a tail-skid 15, a motor 17, and a propeller 18. The parts just enumerated comprise the main structure of the airplane and may be built substantially in accordance with general airplane construction. The different parts are provided with suitable struts and other bracings.

In the form of the invention now being described, a water landing-gear in the form of a pontoon 20 is disposed below the fuselage 11. The pontoon 20 consists of a front stationary part 21 and a back movable part 22. As illustrated best in Fig. 4, the stationary part 21 is rigidly secured to the lower part of the fuselage 11 by struts 24, these struts 24 being connected to the fuselage 11 by brackets 25 and to the stationary part 21 by brackets 26. The movable part 22 of the pontoon 20 is provided with a pivot-bracket 27 which is pivoted on a pivot-shaft 28, the pivot-shaft 28 being secured at the back end of the stationary part 21 at the upper edge thereof. Full lines in Fig. 4 show the movable part 22 in alighting position, and dotted lines 30 show it in retracted position. The movable part 22 is moved between the two positions illustrated in Fig. 4 by mechanism which will now be described.

Secured preferably to the lower part of the fuselage 11 is a cylinder 33 in which a piston 34 is adapted to be reciprocated. Extending from the piston 34 through a stuffing-box 35 is a rod 36. The rod 36 has at its outer end a cross-head 37 which operates in guides 39, these guides 39 being secured to the cylinder 33 by bolts 40 or, if desired, they may be secured directly to the fuselage. Pivoted to the cross-head 37 or the rod 36 is an arm 42, this pivoted end of the arm 42 being located between the guides 39. The lower end of the arm 42 is pivoted by a bracket 43 to the upper portion of the movable part 22 of the pontoon 20. Compressed air may be supplied to the opposite ends of the cylinder 33 by supply-pipes 45 and withdrawn therefrom by exhaust-pipes 46. Suitable means, not shown, may be provided in the airplane whereby compressed air may be supplied to one end of the cylinder 33 so as to force the piston from the position shown in full lines in Fig. 6 into the position indicated by dotted lines 47. At this time the exhaust-line 46 at the opposite end of the cylinder 33 should be opened. When the piston is in the position shown in full lines in Fig. 6, the movable part of the pontoon is retained in the position shown in full lines in Figs. 1 and 4, and when the piston is moved into dotted line position 47, the pontoon is moved into the position shown by full lines in Fig. 2 and by dotted lines 30 in Fig. 4.

As illustrated best in Figs. 4 and 5, the rear end of the stationary part of the pontoon 20 is provided with a chamber 50 which is open at the back and at the bottom. Carried by the movable part of the pontoon 20 are frames 51. These frames 51 may be secured to the pivot-bracket 27, if desired. The frames 51, when the movable part is in the position shown by full lines in Figs. 1 and 4, extend forward into the chamber 50. The forward ends of the frames 51 are provided with plates 52 having vertical slots 53. Carried in the vertical slots 53 is a horizontal shaft 55 which supports a land landing-gear in the form of a wheel 57 between the frames 51. Rubber-band shock-absorbers 58 are provided for absorbing the shocks when alighting upon land. When the movable part 22 of the pontoon is moved into the position shown in Fig. 2 by full lines and in Fig. 4 by dotted lines 30, the wheel 57 is moved into the position shown by full lines in Fig. 2 and by dotted lines 58 in Fig. 4. It will be seen that at this time the wheel projects a sufficient distance below the pontoon 20 so that the pontoon 20 cannot engage the surface of the ground. Pivoted at 60 to the lower part of the stationary part 21 immediately in front of the chamber 50 is a deflector 61. The deflector 61 has sides 62 which extend upward into the chamber 50 near the side walls thereof. A coil-spring 64 is connected to the sides 62 and to the stationary part 21 of the pontoon 20 for the purpose of retaining the deflector against the wheel 57. When the wheel 57 is in the position shown in full lines in Fig. 4, the deflector 61 rests in full line position. When the wheel 57 is in the position indicated by dotted lines 58 in Fig. 4, the deflector is moved into dotted line position 65. The purpose of this deflector is to keep water from rushing into the chamber 50 when the airplane is landing on water. The friction of the deflector 61 against the wheel 57 is not great enough to cause any damage when the wheel is rotated when alighting on land.

The complete operation of the invention is as follows:

When it is desired to alight on the water, the movable part 22 of the pontoon 20 is in the position shown in Fig. 1. The wheel 27 is at this time almost entirely within the chamber 50, and the deflector 61 is in the position shown in Figs. 1 and 4 so that the water will be kept from rushing into the chamber 50. In view of the fact that only a single central pontoon and landing-wheel 57 are provided in this form of the invention, the airfoils 12 are provided with floats 70 and wing-skids 71 which prevent the airfoils from engaging the water when landing on water and engaging the land when alighting on land.

When it is desired to alight on land, the operating mechanism is actuated in the pilot's or the observer's cock-pit so that compressed air is supplied to the right end of the cylinder 33 which moves the piston from full line position into dotted line position 47. This action swings the movable part 22 of the pontoon 20 into the position shown by full lines in Fig. 1 and into dotted line position 30 in Fig. 4. The wheel 57 is at this time automatically swung downward from its retracted position in the chamber 50 to alighting position. The movable part 22 of the pontoon 20 swings upward so that it cannot possibly engage the ground. By referring to Fig. 2 it will be seen that the movable part 22 rests well above a straight line 72 drawn from the portions of the wheel 57 and the tail-skid 15 which engage the ground. The deflector 61 at this time is swung downward with the wheel 57 but does not in any way interfere with its operation. The rubber-band shock-absorbers 58 take the shock of landing on the ground, and in addition to this the compressed air in the cylinder 33 also takes some of the shock so that the other parts of the airplane will be relieved of jars. It will be seen from the drawings that an upward pressure on the wheel tends to pull the piston 34 in a rearward direction against the compressed air in the cylinder 33.

My invention may also be incorporated in other types of airplane; for example, in Fig. 8 I show an airplane 80 having a pair of pontoons 81 which are r¹aced on opposite sides of the fuselage 82 of the airplane 80 and below airfoils 83. These pontoons 81 are formed in accordance with the pontoon 22 and carry wheels 84 shown by dotted lines in Fig. 8. The operation of the landing-gears is the same as in the other form of the invention and the movable parts of the two pontoons 81 are operated in synchronism.

Although I have shown the mechanism for operating the landing-gears in the form of a piston operated by fluid under pressure, it should be understood that other suitable operating means may be substituted.

I claim as my invention:

1. An amphibian airplane comprising: a main structure; a water landing-gear supported by said main structure, said water landing-gear having a stationary part and a movable part pivoted thereto; a land landing-gear carried by said movable part, said land landing-gear being adapted to rest in a chamber of said stationary part when said land landing-gear is in retracted position; an arm connected to said movable part; a piston connected to said arm; means providing a cylinder in which said piston operates; means for supplying compressed gas to said cylinder; and a deflector pivoted to said stationary part for preventing water from rushing into said chamber.

2. An amphibian airplane comprising: a main structure; a water lading-gear supported by said main structure, having a stationary and a movable part, said movable part pivoting on an axis extending at right angles to the line of flight; a land landing-gear carried by said movable part and resting in a chamber of said stationary part when in retracted position; means for moving said movable part and said land landing-gear in order to move said land landing-gear from retracted into alighting position; and a deflector pivoted to said stationary part and extended below said chamber for preventing water from turbulently rushing into said chamber.

3. An amphibian airplane comprising: a main structure; a water landing-gear supported by said main structure, having a stationary and a movable part, said movable part pivoting on an axis extending at right angles to the line of flight; a land landing-gear carried by said movable part and resting in a chamber of said stationary part when in retracted position; means for moving said movable part and said land landing-gear in order to move said land landing-gear from retracted into alighting position; a deflector pivoted to said stationary part and extended below said chamber for preventing water from turbulently rushing into said chamber; and resilient means for holding said deflector against said land landing-gear.

4. An amphibian airplane comprising: a main structure; a stationary pontoon-part having a chamber at the back end; a land landing-gear pivoted near the back end of said pontoon-part and adapted to rest in said chamber; means for moving said land landing-gear into alighting position; and a deflector pivoted to said pontoon-part for preventing water from turbulently rushing into said chamber.

5. An amphibian airplane comprising: a main structure; a water landing-gear supported by said main structure, said water landing-gear comprising a pontoon unit transversely split to provide longitudinally adjacent front and rear pontoon sections hingedly connected at the upper portion of the split with the axis of said hinge disposed parallel to the plane of said split; a land landing-gear carried by one of said pontoon sections and resting in a chamber in the other of said pontoon sections when in retracted position; and means for elevating the free end of said one pontoon section from position of use to retracted position to project the land landing-gear from retracted position to alighting position, and for reversely lowering the free end of said one section to position of use to elevate said land landing-gear to retracted position within said chamber, the elevating hinge movement of said one pontoon section opening said split and the lowering hinge movement thereof closing said split to insure unbroken pontoon side walls in the region of the split when the pontoon sections are in condition for use.

6. An amphibian airplane comprising: a main structure; a water landing-gear supported by said main structure, said water landing-gear comprising a pontoon unit transversely split to provide longitudinally adjacent front and rear pontoon sections hingedly connected at the upper portion of the split with the axis of said hinge disposed parallel to the plane of said split; a land landing-gear carried by one of said pontoon sections and resting in a chamber in the other of said pontoon sections when in retracted position; means for elevating the free end of said one pontoon section from position of use to retracted position to project the land landing-gear from retracted position to alighting position, and for reversely lowering the free end of said one section to position of use to elevate said land landing-gear to retracted position within said chamber, the elevating hinge movement of said one pontoon section opening said split and the lowering hinge movement thereof closing said split to insure unbroken pontoon side walls in the region of the split when the pontoon sections are in condition for use; and a deflector for preventing water from turbulently rushing into said chamber.

7. An amphibian airplane comprising: a main structure; a water landing-gear supported by said main structure, said water landing-gear comprising a pontoon unit transversely split to provide longitudinally adjacent front and rear pontoon sections hingedly connected at the upper portion of the split with the axis of said hinge disposed parallel to the plane of said split; a land landing-gear carried by one of said pontoon sections and resting in a chamber in the other of said pontoon sections when in retracted position; shock absorbing means for elevating the free end of said one pontoon section from position of use to retracted position to project the land landing-gear from retracted position to alighting position, and for reversely lowering the free end of said one section to position of use to elevate said land landing-gear to retracted position within said chamber, the elevating hinge movement of said one pontoon section opening said split and the lowering hinge movement thereof closing said split to insure unbroken pontoon side walls in the region of the split when the pontoon sections are in condition for use.

8. A landing-gear for an amphibian airplane, said landing-gear comprising: a pontoon unit transversely split to provide longitudinally adjacent front and rear pontoon sections hingedly connected at the upper portion of the split with the axis of said hinge disposed parallel to the plane of said split; and a land landing-gear carried by one of said pontoon sections and resting in a chamber in the other of said pontoon sections when in retracted position so that upon elevation of the free end of said one pontoon section from position of use to retracted position the land landing-gear will be projected from retracted position to alighting position, and reversely, when the free end of said one pontoon section is lowered to position of use in longitudinal alignment with the other of said pontoon sections, the land landing-gear will be elevated into said chamber to retracted position, said split being opened when said one pontoon section is retracted and the land landing-gear is in use and closed when the land landing-gear is retracted and the said one pontoon section is lowered into longitudinal alignment with the other pontoon section so as to insure unbroken pontoon side walls in the region of the split when the pontoon sections are in condition for use.

In testimony whereof, I have hereunto set my hand at Los Angeles, California, this 27th day of May, 1927.

JAMES H. KINDELBERGER.